US012458981B2

(12) United States Patent
Scaife

(10) Patent No.: US 12,458,981 B2
(45) Date of Patent: Nov. 4, 2025

(54) HYGIENE ARTICLE RECYCLING UNIT

(71) Applicant: DIAPER RECYCLING TECHNOLOGY PTE. LTD., Singapore (SG)

(72) Inventor: Martin Scaife, Singapore (SG)

(73) Assignee: DIAPER RECYCLING TECHNOLOGY PTE. LTD., Singapore (SG)

( * ) Notice: Subject to any disclaimer, the term of this patent is extended or adjusted under 35 U.S.C. 154(b) by 302 days.

(21) Appl. No.: 18/044,318

(22) PCT Filed: Aug. 27, 2021

(86) PCT No.: PCT/SG2021/050516
§ 371 (c)(1),
(2) Date: Mar. 7, 2023

(87) PCT Pub. No.: WO2022/055422
PCT Pub. Date: Mar. 17, 2022

(65) Prior Publication Data
US 2023/0330683 A1 Oct. 19, 2023

(30) Foreign Application Priority Data
Sep. 8, 2020 (SG) .............................. 10202008761P

(51) Int. Cl.
*B03B 9/06* (2006.01)
*B02C 18/00* (2006.01)
(Continued)

(52) U.S. Cl.
CPC ............ *B03B 9/06* (2013.01); *B02C 18/0092* (2013.01); *B02C 18/067* (2013.01); *B09B 3/35* (2022.01);
(Continued)

(58) Field of Classification Search
CPC ...... B09B 2101/67; B09B 3/35; Y02W 30/52; Y02W 30/62; B02C 18/0084; B02C 18/0092; B03B 9/06
See application file for complete search history.

(56) References Cited

U.S. PATENT DOCUMENTS

2009/0032626 A1* 2/2009 Armstrong .............. B07B 7/086
209/44.3
2010/0292401 A1* 11/2010 Grimes ................... B29B 17/04
528/480
(Continued)

FOREIGN PATENT DOCUMENTS

CN    111386304 A  *  7/2020  ............ B01J 20/261
EP    2902123 A1     8/2015
(Continued)

OTHER PUBLICATIONS

Translation of CN-111386304.*
Translation of TW-202031970.*

*Primary Examiner* — Bobby Yeonjin Kim
(74) *Attorney, Agent, or Firm* — Jordan IP Law, LLC

(57) ABSTRACT

The present invention relates to an equipment in the field of hygiene article manufacturing, in particular to a hygiene article recycling unit for disintegrating and separating hygiene articles allowing to separate raw materials at a purity allowing to directly use it in the manufacturing process of the hygiene articles. The recycling unit comprised several devices as sub-units. The present invention further relates to a process for operating such an equipment.

9 Claims, 6 Drawing Sheets

(51) Int. Cl.
    *B02C 18/06*     (2006.01)
    *B02C 23/16*     (2006.01)
    *B09B 3/35*     (2022.01)
    *B09B 101/67*     (2022.01)

(52) U.S. Cl.
    CPC ..... *B02C 2023/165* (2013.01); *B09B 2101/67* (2022.01)

(56) References Cited

U.S. PATENT DOCUMENTS

| | | | |
|---|---|---|---|
| 2023/0038184 A1* | 2/2023 | Fukumoto | ................. B09B 3/35 |
| 2023/0339004 A1* | 10/2023 | D'Alessio | ................. C08J 11/14 |

FOREIGN PATENT DOCUMENTS

| | | | | |
|---|---|---|---|---|
| TW | 202031970 A | * | 9/2020 | ............. A61L 11/00 |
| WO | 2018060827 A1 | | 4/2018 | |

* cited by examiner

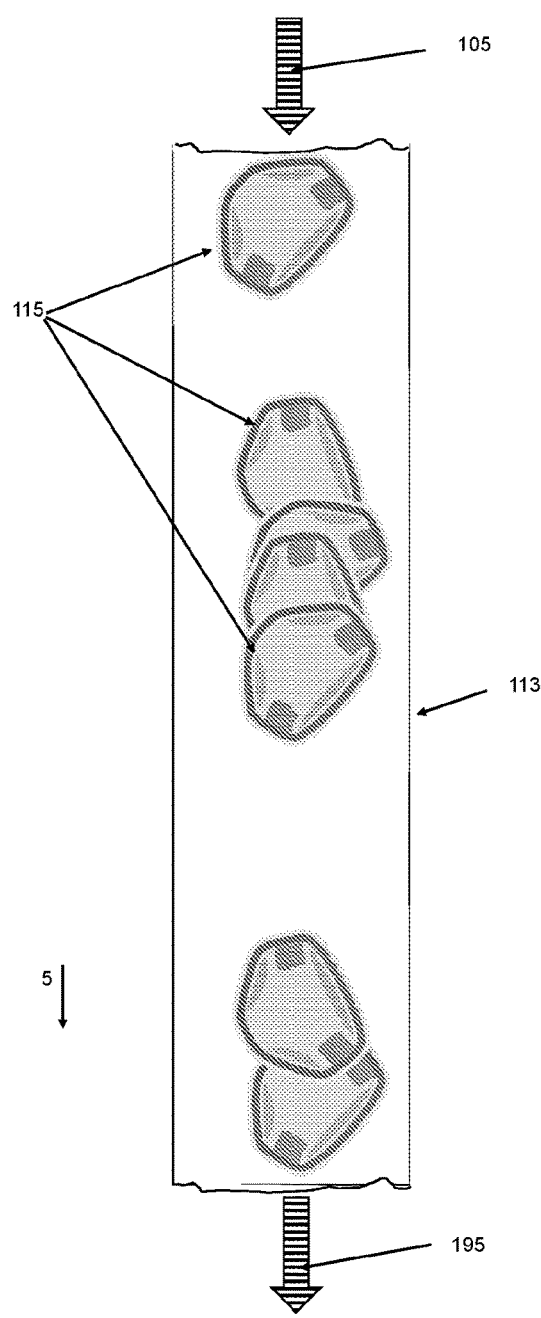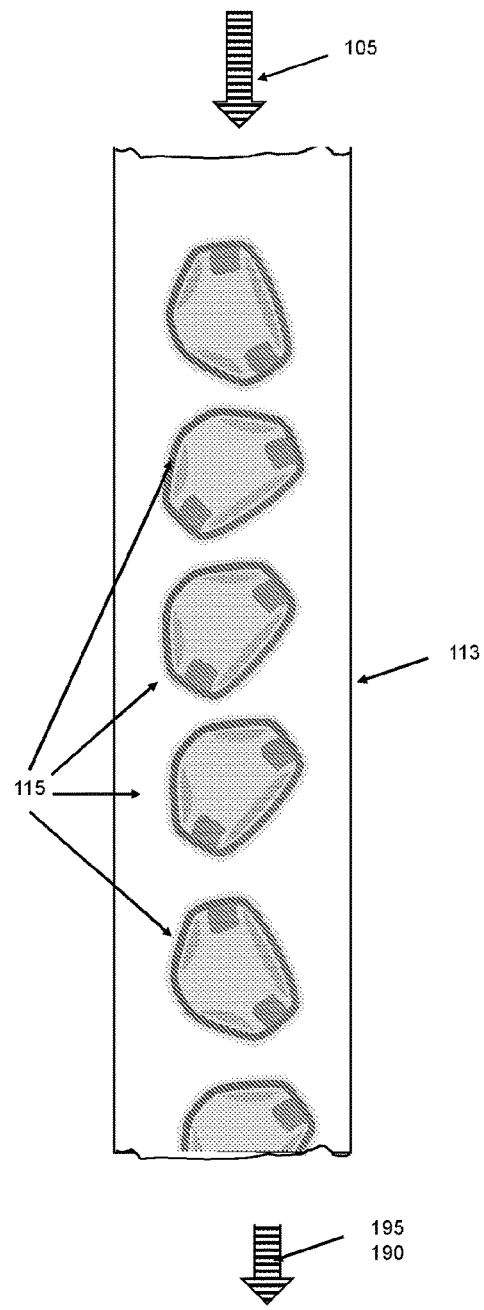
Fig. 2A
Fig. 2B

HYGIENE ARTICLE RECYCLING UNIT

FIELD OF THE INVENTION

The present invention relates to a process and related equipment in the field of hygiene article manufacturing, in particular to an equipment for disintegrating and separating hygiene articles allowing to separate raw materials at a purity allowing to directly use it in the manufacturing process of the hygiene articles.

BACKGROUND

Disposable hygiene articles, including but not limited to absorbent articles such as diapers for babies or adults, training pants, pull-up diapers, diaper pants, sanitary napkins, panty liners, etc., are typically constructed by combining chassis elements and absorbent elements, the latter ones often being referred to as absorbent core, aiming at absorbing bodily exudates, such as urine, faeces, menses and the like, and preventing these from flowing or wicking back to a wearer or to the outside of the article, supported by and held in place by the first elements.

In modern products, the liquid absorption is typically achieved by using so called and well known "superabsorbent polymers" (SAP), often, though not necessarily, in particulate form. Whilst various attempts are ongoing to eliminate cellulose fibers or pulp as a further constituent of an absorbent core, most current products still have an absorbent core comprising pulp and SAP particles, often in the form of a mix or blend. Optionally, the articles comprise further fibrous web materials aiming at enhancing the liquid handling in the article, as may be nonwoven web materials or combinations of synthetic fibers, often made of polyolefins or polyester, and pulp fibers.

The chassis elements are typically made of thermoplastic materials, such as films, nonwovens, or combinations thereof, with polyolefins or polyester being preferred materials. Other elements may be fastening means, such as tapes, elastics, or glues.

Typically, a liquid impermeable backsheet film and a liquid permeable nonwoven topsheet envelop an absorbent core, whilst elastic materials in combination with closure means, as may be tapes, e.g. of the mechanical fastener type, aim at maintaining the article on wearer's body during use.

Such absorbent articles are manufactured on "converter", where the various materials are brought together and combined to form the article that may then be further confectioned and packed. Such converters can run at very high production speed, and a linear speed of a continuous web or composite may exceed 500 m/minute, resulting in more than 1000 articles per minute.

Whilst it would be desirable to run such converter without any interruption with target quality, a real system will experience certain interruptions, may be due to required size changes, to off-spec materials, or process instabilities, which may further lead to off-spec products. Typically, such deviations from target are detected by sensors, that divert such products as scrap.

However, such scrap products or articles not only represent an ecological burden but also a significant economic loss. Henceforth, hygiene manufactures aim at recycling such products, but as the various types of materials are intimately combined in the product, current approaches reduce more or less the value of the recycled materials, mostly due to insufficiently separated materials.

In WO2014/132128 an approach for a shredding device is described with a separation into three fractions of pulp, SAP particles and remaining plastic materials, such as films and nonwovens, as may be further separated in subsequent steps. The equipment can be operated being connected to a single converter, a group of converters or a full manufacturing plants, or separate from a converter. The described technology allows a compact equipment design with several, e.g. three, stages of separation being vertically stacked over each other and can provide separation purities of over 99% for pulp and SAP.

However, there still remain areas of improvement for this approach.

First and foremost, in order to be able to recycle pulp and SAP directly back into the hygiene article manufacturing process, even purities of 99.9% are sometimes not considered sufficient.

Further, sometimes, congestion in the processing unit can occur when transferring the partly separated materials from one stage to the next by gravity.

Also, the cantilevered mounting of the rotating drum requires sturdy, hence heavy and often costly bearings.

The moving parts interfaces between the stage module requires complicate sealing between the stage modules.

There is further the desire to improve on use of auxiliaries like energy or on air management.

Thus, in a first aspect, the present invention aims at overcoming these remaining problems in providing a separating device comprising several devices connected to create the shredding device, especially comprising a buffer, an infeed stream equalization, a pre-destruction device, a separating device, and purifying units.

In a further invention, the present invention is a hygiene article recycling equipment for separating constituents of hygiene articles at high purity by employing such a separating device and combining it with further control and material treatment devices In an even further aspect, the present invention relates to operating such equipment.

There is further the desire to apply the process and equipment for the recycling of post-consumer waste. Whilst the process and equipment remains similar for the separation and purification as outlined in this patent, an additional sterilization step may be included as outlined in WO2016/204697.

SUMMARY

The present invention is a hygiene article recycling unit adapted to separate plastic material, superabsorbent polymer and optionally pulp comprised in hygiene articles, whereby the recycling unit comprises
  an article supply and buffer;
  an infeed article stream equalization system;
  an article pre-destruction device;
  a shredding and separation device;
  a pulp/SAP separation system.

The recycling unit is adapted to provide recycled pulp—if present—at a purity of more than 99 w-%, and recycled superabsorbent polymer (SAP) material at a purity of more than 99 w-%.

The hygiene article recycling unit may comprise an infeed article stream equalization system comprising
  a article chamber adapted to receive articles for separation;
  a picker system,
    preferably comprising
      picker arms that are adapted to allow temporary connecting of articles thereto and that connected to a picker bar;

a picker bar mounting adapted to move the picker arms from a pick-up position to a release position;

article removal device, preferably a transport belt.

The shredding and separation system of the hygiene article recycling unit may be adapted to disintegrate hygiene articles and to separate constituents thereof. It may further comprise an air pressure sealed housing, comprising shredding device inlet lock for feeding articles and shredding device outlet lock for removing separated parts of the articles;

at least one rotating drum inside the housing, preferably two parallel counter-rotating drums, whereby the at least one rotating drum comprises drum inlet and outlet connected to the shredding device outlet locks, respectively;

apertured, and preferably removable shell elements;

a rotating shredder shaft positioned inside and essentially parallel to the axis of the rotating drum with its axis being positioned between the axis of the drum, whereby the rotating shredder shaft further comprises shredding elements along its outer circumference and along its length, which are preferably stationary.

The housing may further comprise a transport system, preferably longitudinally extending essentially endless belts, for capturing materials as passing through the apertures of the drums.

The drum(s) and the shaft(s) are preferably supported at each of their ends and the shredder shaft(s) exhibit(s) an outer circumference which is larger towards the inlet than towards the outlet, whereby the rotating shredder shaft further comprises shredding elements along the outer circumference and along the length.

The hygiene article recycling unit may further comprise a pulp/SAP separation system which comprises mix mat former multi stage vibration separator for separating pulp and SAP, optionally an optical pulp purity scanning system, connected to an air nozzle separation system;

SAP fluidized bed separators;

optionally gravimetric pulp refeed system;

optionally an SAP fines removal system.

The hygiene article recycling unit may comprise a pulp/SAP separation system comprising a SAP fines removal system.

In another aspect, the present invention is a process for separating pulp and SAP from plastic material of hygiene articles, which comprises the step of operating a hygiene article recycling unit as described in the above, and may further comprise the steps of providing articles for separation in an infeed buffer;

feeding the articles to an article infeed stream equalization unit;

feeding the articles to a pre-destruction device;

pre-destructing the articles in the pre-destruction device;

feeding the articles from the pre-destruction device to t shredding and separating unit;

separating the components of the article into a plastic stream comprising thermoplastic material of the articles;

a pulp/SAP stream comprising pulp and SAP material of the articles;

separating the pulp/SAP stream into a pulp stream and an SAP stream;

preferably further comprising the step of removing fines from the SAP stream.

BRIEF DESCRIPTION OF THE FIGURES

FIG. 2A to D depict an article stream equalizing system as may be suitably use in the present invention.

Same numerals refer to same or equivalent features or elements and numerals with apostrophes (e.g. xx', xx", ...) refer to multiple features or elements, e.g. in a left-right configuration. All figures are schematic and not to scale.

DETAILED DESCRIPTION

Figure 1:
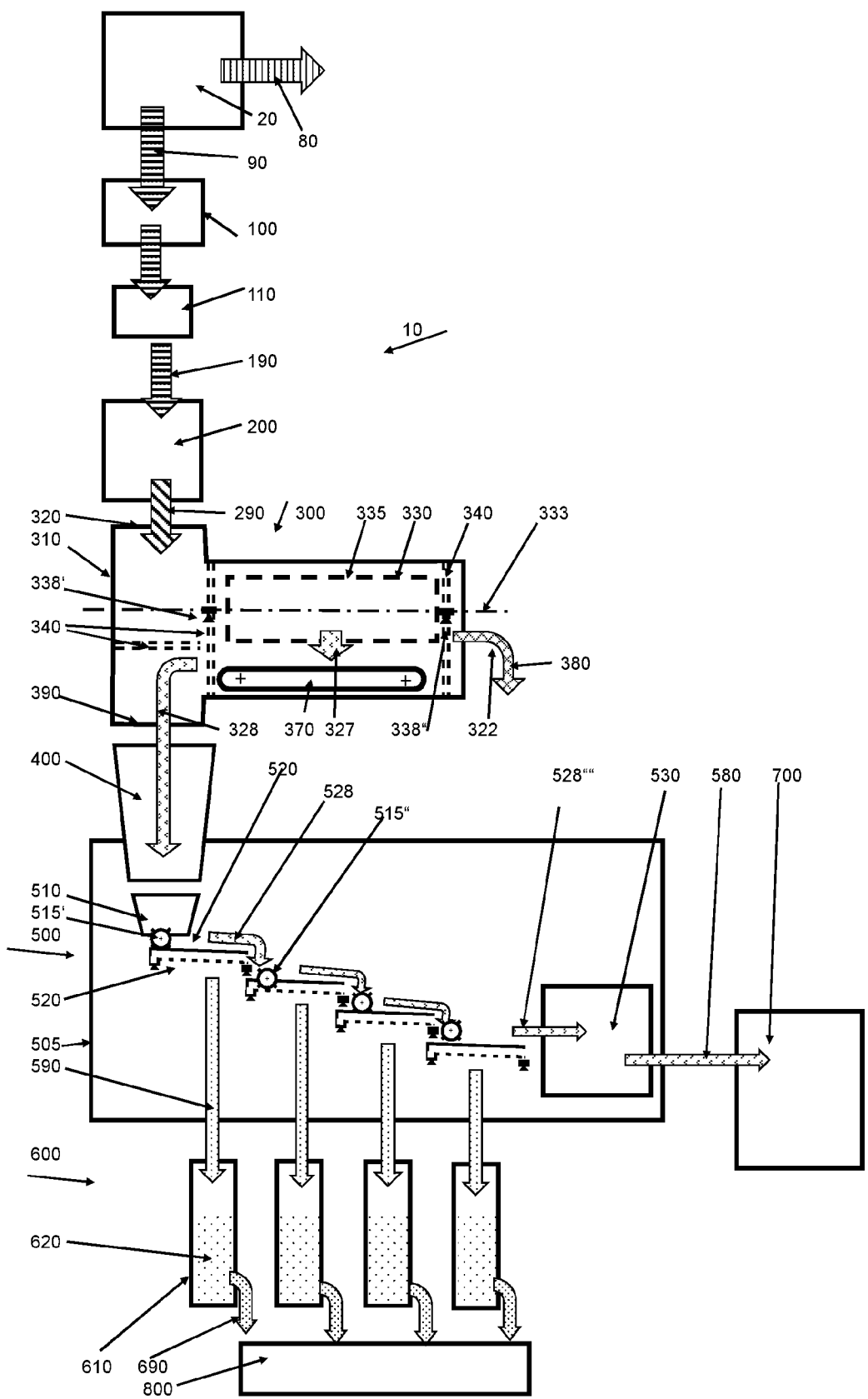
FIG. 1 shows a set-up for a hygiene article recycling unit according to the present invention.

The present invention is directed towards separating components of hygiene articles, in particular articles that may comprise pulp, SAP as well as other plastic, typically thermoplastic materials.

To this end, the hygiene article recycling unit may comprise a hygiene article infeed buffer system an article infeed stream equalization;

a pre-destruction device;

a shredding/separation device, providing a pulp/SAP fraction and a plastic material fraction;

a pulp/SAP separation device, comprising a pulp/SAP mat former;

at least one, preferably more than one, more preferably four pulp/SAP separator sieves, preferably vibrating sieves;

a SAP refinement unit;

a pulp refinement unit, that may comprise an optical contamination detection system;

an air jet system for removing contaminations, such as plastic residues.

Due to the high purity of the pulp and SAP resulting from the present invention, these may further be directly re-fed into the manufacturing process for the hygiene articles. Alternatively, these materials as well as the separated plastic material may be collected for further processing.

The overall system is set-up by comprising the devices, arranged an overall process direction from a scrap infeed providing a continuous or discontinuous stream of scrap articles towards the separation step, where the articles are separated into their constituents, which are then further refined along their respective sub-streams.

Such units may be operated at a wide range of articles, such as diapers, feminine hygiene pads, or adult incontinence articles, and corresponding streams of 15 pieces per minute, or up to 600 pieces per minute, or more than 200 kg/hr, or more than about 400 kg/hr, or more than about 600 kg/hr.

Infeed Buffer Device/Buffer Case

Preferably the recycling unit comprises a infeed buffer to decouple the recycling unit from the converter, when e.g. during start-up more scrap articles are generated as compared to regular operation.

The buffer device may be constructed with a modular structure, e.g. a steel frame with solid plate walls, preferably with a hatch and separate doors to allow easy access to the various device elements.

In another execution, the infeed buffer device may be operated independent of a converter, in particular when post-use articles are to be recycled after these were submitted to a sterilization and preferably a drying step.

An Infeed Article Stream Equalization System

Whilst the subsequent systems do have a good resiliency with regard to article stream and flow variations, it has been found that occasionally undesired jamming can occur in case of an accumulation of articles. Thus it is desirable to equalize the stream of articles.

In a first approach, a lifting table, preferably with a lifting device, is loaded with articles and adapted to keep the articles at appropriate level for a robotic system. Then, a robotic device is adapted to grip material from anywhere of the lifting table and simplifies the transfer of material from the diaper storage area to the transfer conveyor. It also allows to reduce the number of assemblies, in particular to eliminate the feed conveyor. The robotic device may be a singular or multi-axis robot, preferably made with a light weight material such as aluminium or carbon fibre material. It is designed to grip articles by vacuum or mechanical means from the feeder table and to place these reproducible on the transfer system, e.g. a conveyor system or directly into the pre-destruction process.

Pre-Destruction Device

The pre-destruction device receives the articles one-by-one as being delivered via the transport system from the article stream equalization system. They are transferred to top transfer conveyors, as may be executed as at least two, preferably between 2 to 50 conveyors. Preferably these may be arranged as cantilever conveyors, which may exhibit an overall width of more than about 200 mm, or more than 300 mm, or more than 400 mm, or more than 500 mm, as may be adapted to the size of the articles. In cooperation with bottom conveyors, the articles are fed towards and pre-destructed by a flywheel with hammer and the resulting pre-destructed articles fall into a pre-destructed article cavity.

Shredding and Separation System

From the pre-destructed article cavity of the pre-destruction device, the partly destructed articles are transferred to a shredding and separation system.

The shredding and separation system comprises a housing, which in a preferred execution comprises air tight sealing or close to air tight sealing, except for the designated inlet and outlet openings. Preferably, the housing is executed in a frame and shell design, wherein the walls withstand an internal under-pressure. The frame also serves as support for inside equipment. Preferably, the housing the dimensions of the housing are such that they correspond to a standard "40 ft ISO container".

The shredding and separation system further comprises at least one, preferably a pair of, separation drum(s), adapted to receive pre-destructed products or articles and to separate these into small constituents, in particular pulp and SAP, and residual constituents, in particular the remaining plastic parts of the article.

In a particularly preferred execution, a separation drum extends along a longitudinal axis, exhibiting a length of more than about 1 m, preferably more than about 2 m, or even more than about 3 meter, preferably less than about 10 m or less than about 6 m, most preferably between 3.5 and 4.5 m. The drum comprises an essentially cylindrical surface, also referred to as shell, comprising apertures. The diameter of the drum may be more than about 0.2 m, or more than about 0.5 m, or even more than about 0.8 m, and less than about 1 m, preferably between 0.45 and 0.55 m.

The apertures are adapted to allow pulp and SAP to pass through whilst retaining the plastic constituents of the pre-destructed articles. The shell may be prepared by any suitable material withstanding the shear forces of the operation. Preferably, the shell is made of stainless steel. Preferably, the shell is made of removable segments, e.g. having a length of less than 50% of the drum, or less than about 33% of the drum, or less than about 25% of the length of the drum, or of less than about 1.5 m and more than about 0.5 m, preferably of about 1 m and cover a quarter of the circumference. The drum further comprised reinforcements ribs for supporting the shell, preferably made of plastic material.

In a particularly preferred execution, a drum is supported at both ends by bearings to allow smooth operation and avoid wear of bearing as may occur in a cantilever design. A drum comprises a drum drive. A drum comprises an inlet opening adapted to receive pre-destructed articles.

A drum is positioned generally horizontally at an incline angle of less than about 45° from inlet to outlet opening, or less than about 30°, whereby the incline angle is preferably adjustable between 0° to 45°.

Within a drum, a shredding shaft is positioned essentially parallel, but offset to the longitudinal centreline of the drum.

The shredding shaft may extend along the length of the drum and supported at both ends by bearings. The shredding shaft is driven by a shredding shaft drive.

The shredding shaft exhibits a diameter that is reduced from the inlet towards the outlet of the drum, preferably in stages, such that there are at least two, preferably more than two, most preferably four essentially cylindrical sections of the shaft with consecutively reduced diameter.

The shredding shaft comprises stationary shredding elements affixed on its outer surface, that extend radially outwardly. For manufacturing reasons, but also for allowing gentle yet effective treatment of the pre-destructed products, a shredding element may have a cuboid shape. The shredding elements may be circumferentially and longitudinally spaced and may have identical shape, size and spacing across one stage or even across the full length of the shredding shaft.

The shredding and separation system may comprise more than one drum in one housing, preferably two drums, arranged in parallel. These drums may be fed with pre-destructed products or articles in a consecutive operation (i.e. all of the feed going into one drum) or in parallel.

Thus, during operation, the shredding/separation device provides a stream of plastic exiting at the plastic exit of the shredding device for further processing or bulk storage, and a stream of a pulp and SAP mixture, as may be processed in the pulp/SAP separator, preferably via the Pulp/SAP mat former.

Pulp/SAP Chute and Mat Former

Upon exiting the separation and shredding system via the pulp/SAP outlet, the pulp/SAP mixture is preferably transferred to the feeder of the mat former. The mat forming feeder comprises a chute, preferably essentially vertical oriented, and may comprise a conical portion to connect the wider outlet of the shredding drum with the narrower mat former.

Preferably, the mat former comprises a scarfing roll system, which, in cooperation with the described chute functions as a volumetric feed system to the subsequent separators.

The scarfing roll also provide further opening of fibre bundles as still may be present, thereby easing the separation of pulp and SAP significantly.

Pulp/SAP Separator Device

The chute and the mat former with a scarfing device from an even and fluffy mat of the pulp and SAP on the sieves of the vibrating hopper. Preferably, it is constructed with a modular structure of frame for easier and highly accurate assembly.

The sieve of the vibration hopper exhibits apertures with sizes adapted to retain fluff fibers but to allow SAP particles to pass through. The SAP is collected underneath the sieve for further processing of SAP refinement, see below.

Preferably, the pulp/SAP separation device comprises at least two, more preferably four consecutive stages of the vibration hopper. For each stage, the mat may be re-formed by a further scarfing device.

Pulp Refining Device

In case the pulp/SAP mixture leaving the separator drum still comprises plastic residues at an undesired level, these will be carried together with the pulp fraction through the pulp/SAP separator.

In order to remove these, a pulp scanning system may be implemented and combined with air jets, that are activated to blow these contaminations out of the pulp bed.

To this end, a system of optical detectors can be implemented over the last stage of the vibration feeder, preferably multiple types of detectors, namely colour video cameras, UV cameras, and/or ultrasonic transmitters and detectors. With appropriate image analysis software combined the exact position of contaminations can thusly be detected.

When further providing a row of closely spaced air jets, e.g. of the Festo MHJ type, with 56 nozzles spread over a width of 1.2 m, or about a nozzle for every 2 cm, combined with accurate speed control of the moving pulp bed, an appropriate air nozzle can be activated, thereby blowing the contamination out of the pulp bed. Thus, the resulting pulp is essentially free of contaminants and may be directly fed back into the hygiene article production process, or be stored in bulk, e.g. in a bulk storage device which may comprise a receiving hopper with a transport conveyor, which is preferably an extruded conveyor belt of TPU or PTE, that allows long lifetime and easy maintenance. The hopper may be of a size to allow continuously feeding a constant stream of pulp back to the article manufacturing line. Preferably, this refeeding is gravimetrically controlled.

SAP Fluidized Bed Refiner

The stream of SAP particles as collected underneath the sieves of the vibrating hopers may comprise contaminations such as very small amounts of pulp fibres or break-up, or even small plastic parts, as may be below or well below 1% by weight. However, when recycling the SAP particles into the hygiene articles, even such small amounts of fibres may be undesirable, as these may impact liquid handling performance point and/or flow properties of the bulk SAP.

Henceforth, the SAP particles may undergo a further refining step. To this end, the particles are collected in a refiner vessel, preferably each one connected to a stage of the vibration hopper of the pulp/SAP separator device. The refiner vessel may have a cylindrical shape and is operated as a fluidized bed by inserting small amounts of air at the bottom of the vessel into the bed of SAP particles. The air is "bubbling" upwardly, carrying the lighter density contaminants also upwards. At the top of the fluidized particle bed, the can be removed at the top of the vessel, and the refined SAP at the bottom.

Such an operation results in an essentially fibre free SAP material, which can easily be recycled directly into the hygiene article manufacturing system, or stored as bulk material.

SAP Fines Removal

A further element that may be very suitably incorporated in the recycling unit according to the present invention is a device that removes fines from the bulk SAP material, such as resulting from break up during the manufacturing or in course of the above separation, Such a system may comprise a rotary separation device, as explained in more detail in co-pending application SG10202008758Q, published as WO2022/055423, to which express reference is made as far as the purification of the SAP is concerned.

Overall Structure and Operation

The various devices are preferably assembled by a modular frame that fits ISO container dimensions, e.g. 6.4 m×2.23 m×[(2*2.65 m) or 6 m]. Thus, an upper module may comprise the shredding device with the drum, and a lower module the SAP/pulp separation and refining devices. The covers are preferably executed with airtight sealings, with sealed door access.

Whilst each and every of the described units may be operated alone or with units other than the ones described herein, it is preferred that the hygiene article recycling unit comprises all of the described units, whereby every of the devices listed in the above improve the efficiency of the overall system synergistically. Thus, the scrap article buffer, allows to decouple the recycling process from the article manufacturing process, or provides a source for constant articles supply, e.g. in case of recycling post-use articles, allowing to optimize the processing speed of all subsequent process steps on the subsequent devices accordingly. The infeed article equalization system allows to position the articles properly for an accurate operation of the pre-destruction device, which thusly tears the articles gently apart thereby reducing the creation of small plastic particles, that may run through the shredding drum into the pulp/SAP separation devices, thereby avoiding to overly burden these systems.

The shredding and separation system can be adapted to match the amount and size and shape of the incoming pre-destructed articles, by appropriately adjusted rotational speed, residence times, size of the shell apertures, size, form, and number of the shredding elements of the shaft(s). The pulp/SAP chute decouples the SAP/pulp stream as coming from the shredding device and distributes the mixture evenly cross-directionally so as to ease the even mat forming as then performed by the first scarfing device.

The gentle vibration of the pulp/SAP separation hopper not only ensures good separation but also minimized the damage both to the pulp fibers and the SAP particles.

Further, if the separation of the separation hoppers is insufficient, the pulp refiner device will not be able to eliminate the last residues, as well as the SAP refiner may be overloaded.

However, it is also within the scope of the present invention to combine and operate the various devices, and in particular the shredding device with other conventional devices, which still may provide improvements compared to known systems, e.g. as described in the above referenced WO' 128.

Conversely, each of the devices as described in more detail may also be combined with other, conventional shredding/separation devices, e.g. as described in the above referenced WO' 128.

Exemplary Execution

Figure 2C:
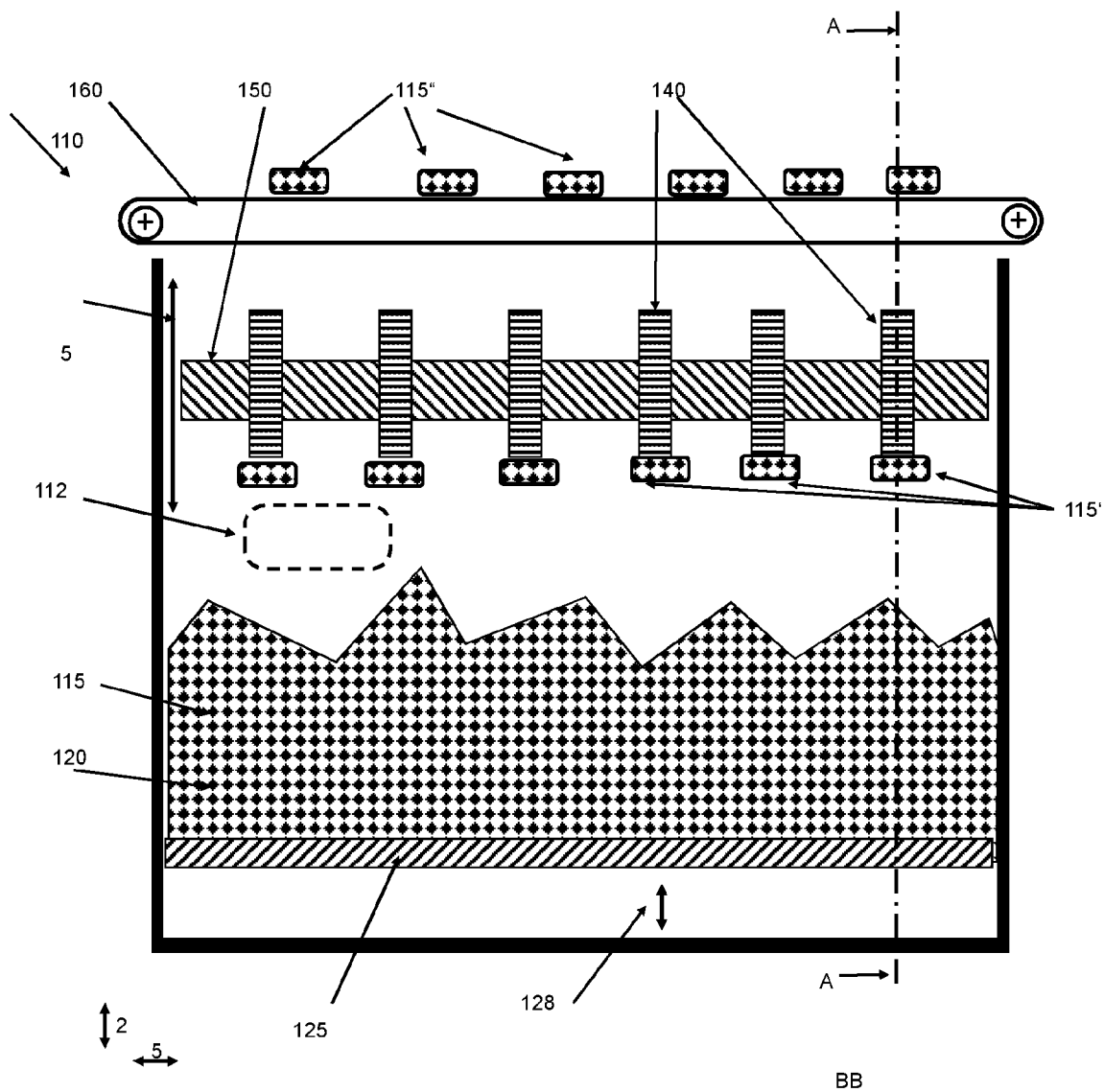
Figure 2D:
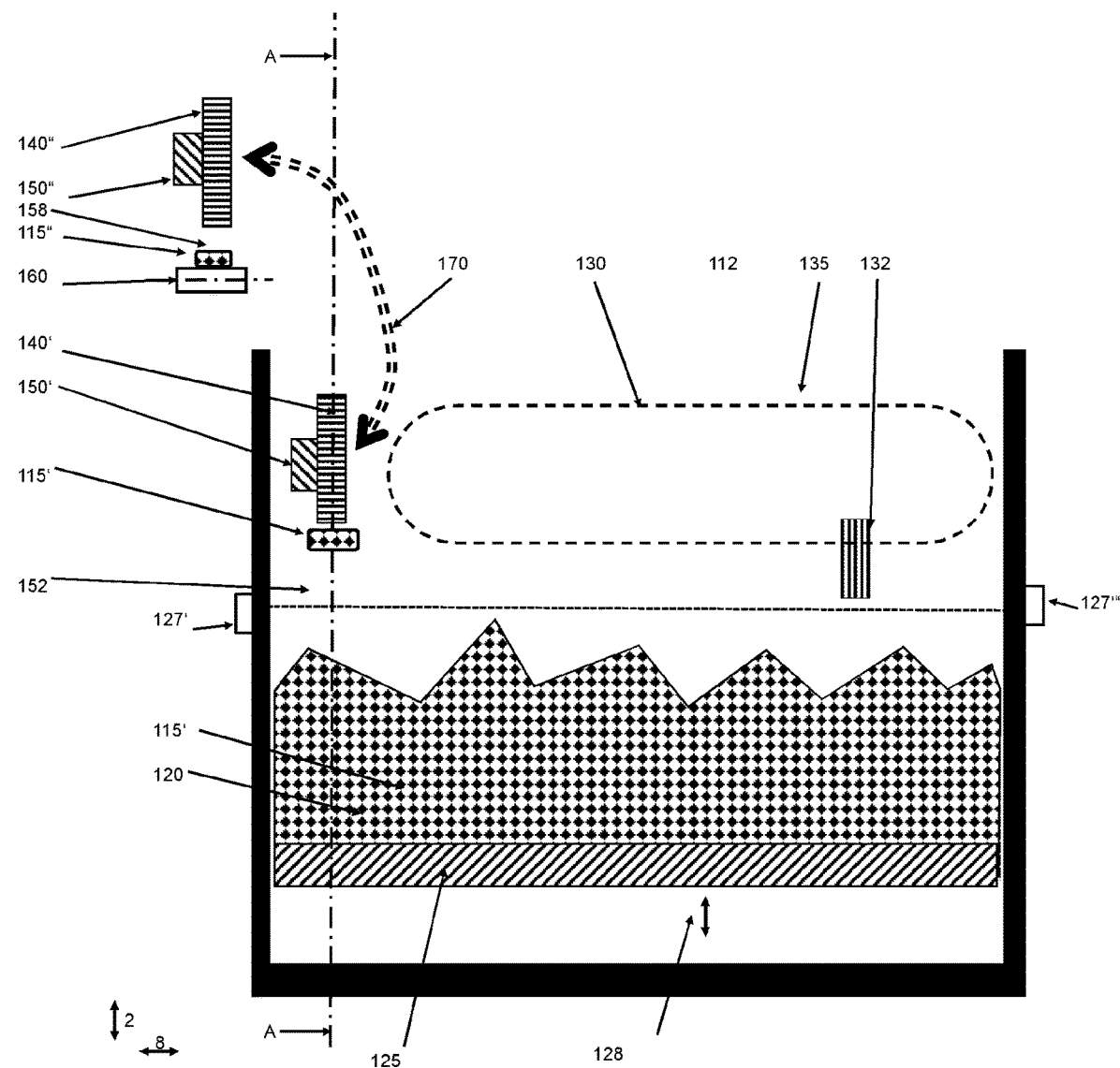
Figure 3A:
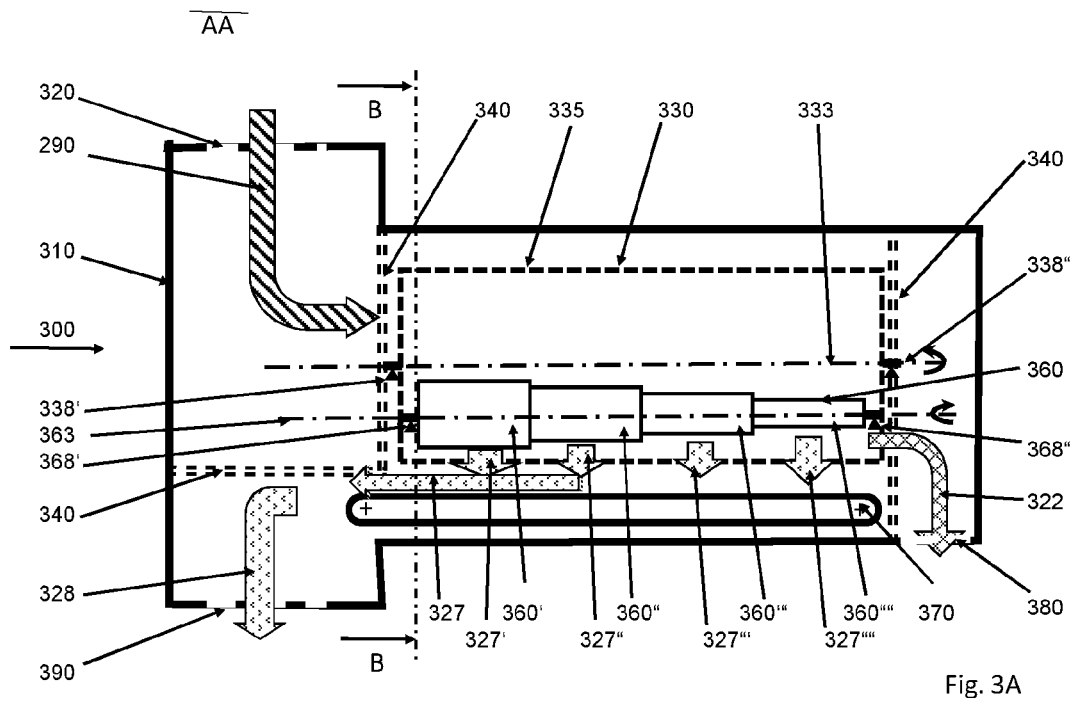
FIGS. 3A and B show a shredding/separating device as an element of the recycling unit.
Figure 4:
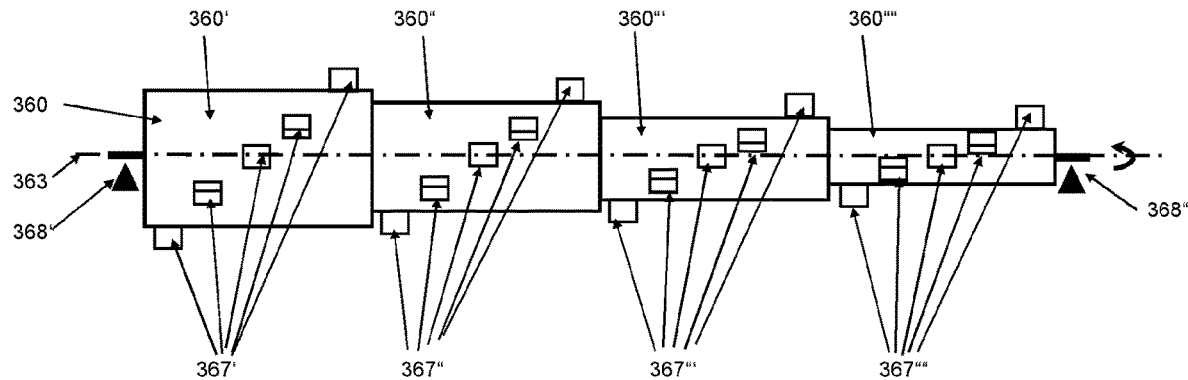
FIG. 4 depicts a particular feature of the shredding/separating device.
Figure 5:
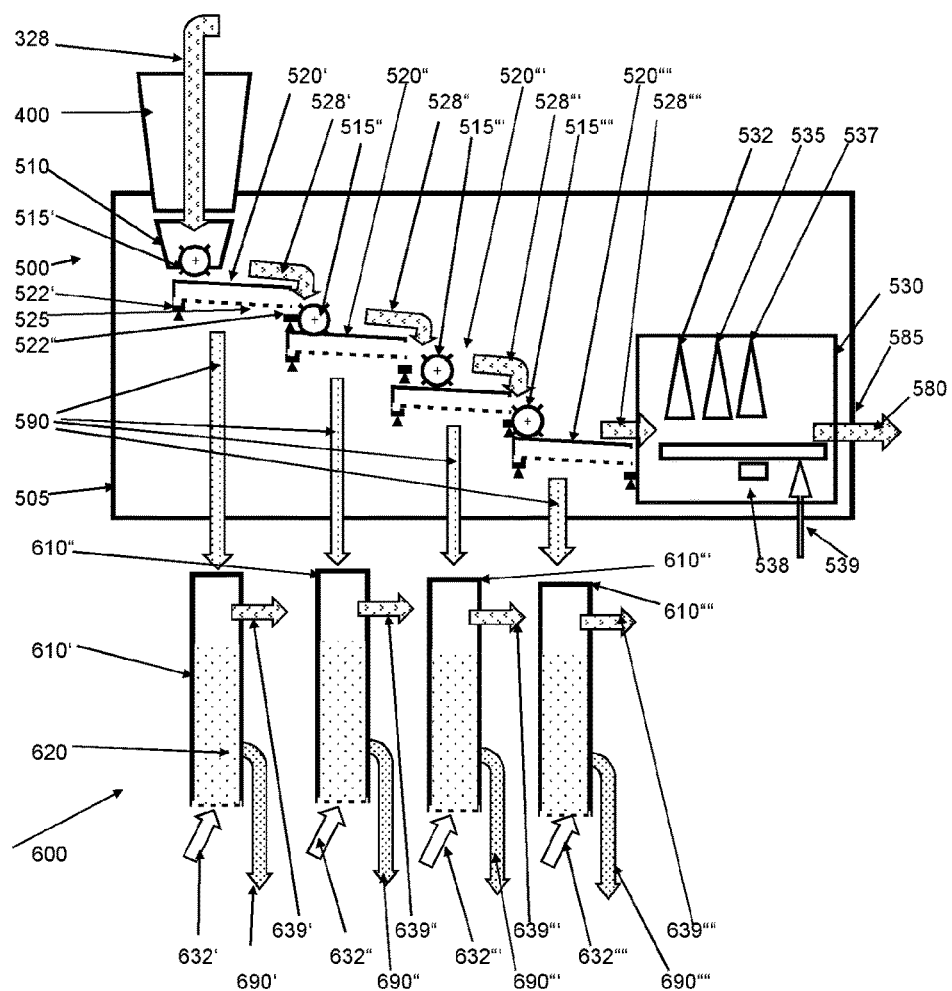
FIG. 5 depicts the pulp/SAP separation device of the recycling unit.

An exemplary execution for a hygiene article recycling unit and its operation is depicted schematically in FIG. 1, with details of specific devices therein depicted in FIG. 2A to D, FIGS. 3A and B (depicting a schematic cross-sectional view along line AA and BB, respectively), FIG. 4, and FIG. 5. For the present discussion, the articles are considered to consist essentially of pulp, SAP, with all other material being summarized as "plastic". Article or material streams are depicted as filled large arrows.

A hygiene article manufacturing line or converter 20 produces a series of articles 80 that satisfy quality or specification criteria and leave the converter at good article outfeed for being processed further, e.g. packed and shipped (not shown). Articles 90 that do not satisfy the criteria or specification are expelled from the line at off-spec or scrap outfeed and transferred to a buffer device 100 to allow balancing of periods with a high scrap rate, e.g. during start-up, with stable production periods with less scrap. The buffer is connected to or infeed article stream equalization system 110 that "grabs" individual articles and repositions these evenly spaced such that they can be readily and easily further processed.

A particular execution of a infeed article stream equalization system 110 is described by referring to FIG. 2A to D, which, however, should not be seen limiting in any way. FIG. 2A depicts an article stream with a series of articles 115 in an uncontrolled and irregular distancing on a transfer belt 113, which possibly may create jamming in the subsequent process steps. In contrast, FIG. 2B shows a more desirable article stream of much more controlled and more evenly distanced stream of articles 115. This may be achieved by an infeed article stream equalization 110, as shown in FIG. 2C in a x-z cross-directional view. The articles are delivered from the buffer system and deposited via article chamber inlet 112 in the article chamber 120, there show as bulk articles 115'. The article chamber is most preferably equipped with a movable bottom or floor 125, which by control system e.g. an optical charging level detection and control system 127 and a height adjusting device (not shown, movement indicated by arrow 128). Optionally, a levelling device 130 may be installed so as to equalize the level of the article in the article chamber, as may be a simple scraper 132 moving along a vertical oval scraper transport device 135.

The device further comprises a picker system, comprising picker means which are adapted to allow temporarily connecting a single article to themselves. The selection of the picker system is not particularly limited, and may be gripper, as known from grab-cranes, or by needles as may be inserted into the articles. A particularly preferred execution, as exemplarily shown in FIGS. 2 C and D, employs movable vacuum nozzles 140. There may be several thereof, in FIG. 2 C exemplarily shown are six, connected to picker bar 150. The picker bar 150 is moveable in the x direction, so as to allow access to all positions along this axis. It is further movable in the z direction (e.g. upwardly) and at the same time also y-directionally (see FIG. 2D—numeral 8), so as to allow positioning of the bar, with the picker systems, e.g. nozzles connected thereto from a pick-up position 152 to a release position 158. The pick-up position is just above the levelled articles 115' in the article chamber 120, whilst the release position 158 is above a transport device, here exemplarily shown as a belt system 160, and an article is 115' is sucked to the vacuum nozzle 140, but also gripper system without vacuum (not shown) may be employed. The movement can be achieved by mounting along e.g. a path 170, the mounting system comprising a drive system and may further comprise guide rails. Preferably, the drive system comprises cams that allow gently acceleration of the picker bar with nozzles and articles attached thereto. The process cycle may start at the lowermost pick-up position 152, where the lower nozzle spouts are close to the article and further extending downwardly from the bar towards the articles until contact is made, e.g. supported by flexible springs. Whilst it is preferred that contact is made between each nozzle and a single article, also two or even three articles per nozzle may be acceptable for certain article, especially when of smaller size. Thereupon, vacuum suction is applied, thereby attaching the articles to the nozzles. Then the mounting and the drive system pivot the picker bar 150 with the nozzles and the articles 115' attached thereto upwardly an outwardly of the article chamber towards the release position just above the transport device. Upon switching off the vacuum system, e.g. by a mechanical limit stop, the articles drop off onto the transport belt and such that articles 115" are positioned evenly spaced apart to be transported towards the next device, e.g. the pre-destruction device. The picker bar 150 with the nozzles 140 is moved back to the pick-up position 122, ready for the cycle to be repeated. The picker bar 150 and nozzle system 140 is preferably executed with minimal weight, e.g. by employing carbon fiber reinforced polymers.

Preferably, the movement is not a straight "up/down" movement, but preferably a sinusoidal curve helps avoiding sharp accelerations resp. declarations, thusly avoiding mechanical stress.

The thusly repositioned articles 190 are transferred to a pre-destruction device 200, wherein cantilevered transfer belts transport the articles to rotating flywheels tearing the articles apart into pre-destructed articles 290. Thereby only few or even none of too small pieces are created, as e.g. cutting devices may create otherwise.

Figure 3B:
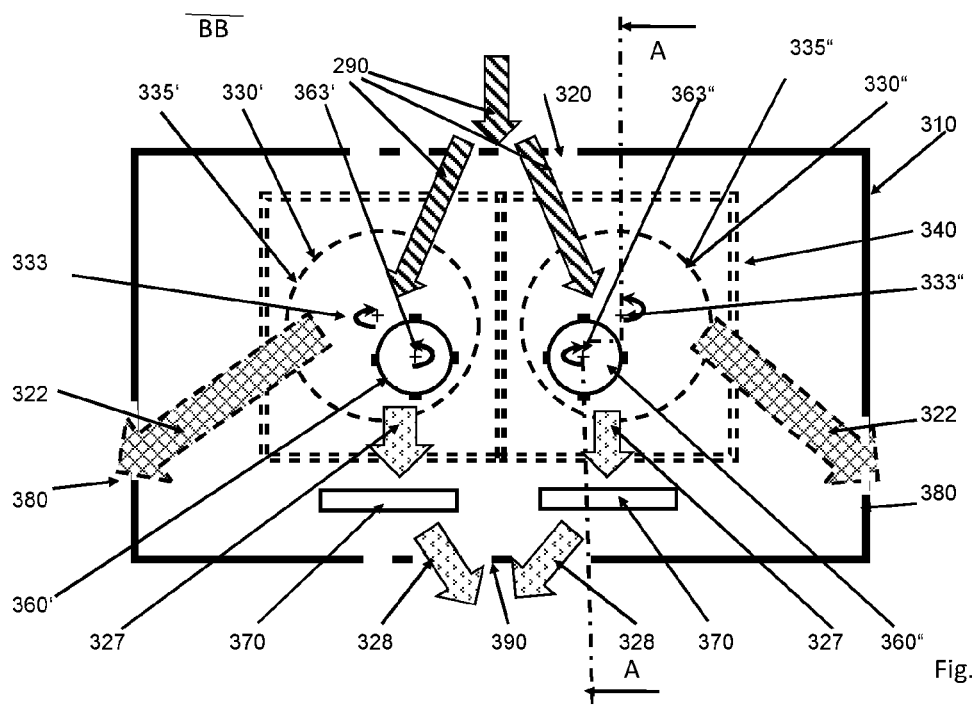

The pre-destructed articles 290 are then transferred to the shredding device 300. As depicted in FIGS. 3A, 3B, and 4 in more detail, the shredding device 300 comprises a housing 310, with an inlet opening 320 through which the pre-destructed articles 290 are fed. The shredding device further comprises frame and separation walls 340, which are shown fragmentarily only.

Further, two shredding drums 330, 330'. 330" are positioned essentially horizontally and parallel with axes 333 and each two support bearings 338', 338" at the ends, and driven by motors (not shown). A drum 330 further comprises an apertured shell 335 with its apertures adapted allow SAP and pulp 327 to pass through, but the larger plastic parts are retained, such that the pre-destructed articles 290 enter the drum at the end towards the inlet opening and the plastic parts 322, at least almost SAP/pulp free, leave the drum and the shredding device at plastic outlet 380 for being stored or further processed (not shown).

Inside of each drum 330 a shredding shaft is positioned, extending over the full length of the drum with its axis 363 essentially parallel but offset relative to the axis of the drum. A shredding shaft is driven by a motor (not shown) and is supported at its ends by shredding shaft bearings 368' and 368". A shredding shaft is rotating counter-directionally to the direction of the drum 330. The shredding shaft comprises shredding elements 367 on its outer surface, distributed circumferentially and longitudinally. As depicted, a shredding shaft exhibits a larger diameter at the end towards the inlet opening, here shown by four stages 360', 360", 360"', 360"" with consecutively reduced diameter.

The pulp and SAP stream 327, respectively 327', 327", 327"', 327"" corresponding to the stages of the shredding shaft 360, which is passing through drum shell 335 is captured on a transfer device, here shown as a transfer belt 370, leaves the shredding device 300 as pulp/SAP mixture 328 at pulp and SAP outlet 390 and is transferred to the pulp-SAP separation device 500 via a chute 400, that evenly spreads the pulp/SAP mixture evenly cross-directionally perpendicularly to the plane of FIGS. 1 and 5.

As also shown in FIGS. 1 and 5, the pulp-SAP separation device 500 comprises a housing 505 and frame and separation walls (not shown). The pulp/SAP mixture is volumetrically and evenly fed by the mat former 510 with a first scarfing roll 515' to the first vibration hopper 520'. The mat former further opens up the fiber bundles, that may entrain the SAP particles, and an even lofty mat is fed to the vibration hopper 520, in the execution as depicted four, 520', 520", 520"', 520"". Each is supported by vibrating suspension systems 522, and at the transfer from one hopper to the subsequent one, the mat is re-formed by further scarfing rolls, 515", 515"', 525"".

The vibration hoppers further comprise a sieve, allowing SAP particles to pass through, but pulp fibers not. Thus the pulp is more and more purified over the stages, to be then transferred to the pulp refining step 530, where any residual impurities, as may be small plastic pieces, are removed.

To this end, the pulp refiner 530 comprises an optical video camera system 532, preferably comprising a set of two cameras for visible light frequencies, a UV video camera system 535, preferably comprising a set o two cameras for UV light frequencies, and an ultrasonic emitter 537 and detector 538 system. These systems are connected to an image analysis system (not shown) that calculates from these systems the position of a contamination in the moving mat, and activates one or more of air nozzles 539. These air nozzles 539, only one of which is depicted, are positioned evenly distributed cross-directionally, i.e. in the direction of the viewer, underneath the mat, e.g. 56 nozzles for a mat width of 1200 mm. These air nozzles blow the contamination out of the mat into the air space above, where they are removed by slight vacuum. The refined, virtually pure pulp stream 580 is then transferred through pulp outlet 585 to further processing, e.g. via a buffer 700 refed into the article manufacturing process.

As the SAP passes through the sieves of the vibrating hopper 520, it is collected for each of the hoppers and the SAP streams 590', 590", 590"', 590"" that may comprise small residues of broken fibers or plastic parts, are transferred to the SAP refiner device 600.

The SAP refiner device operates on the fluidized bed principle, and comprises for each of the SAP streams 590 a fluidized bed vessel 610. The SAP stream 590 is fed at the top of these vessels and accumulates at the bottom, where counter-currently air stream 632 is injected, "bubbling" upwardly and thusly forming the fluidized bed 620. Thereby, lighter density contamination such as fiber or plastic residues are flowing upwardly and exit the vessel with the air stream 639. The virtually pure SAP can then be collected in SAP buffer 800 for further processing, e.g. refeeding into the article manufacturing process.

The invention claimed is:

1. A hygiene article recycling unit adapted to separate plastic material, superabsorbent polymer and pulp, if present, comprised in hygiene articles, comprising:
an article buffer device;
an infeed article stream equalization system;
an article pre-destruction device;
a shredding and separation device;
a pulp/superabsorbent polymer (SAP) separation device that separates SAP material from pulp,
wherein said recycling unit is adapted to provide
recycled pulp, if present, at a purity of more than 99 w-%;
recycled SAP material at a purity of more than 99 w-%.

2. A hygiene article recycling unit according to claim 1, further wherein the infeed article stream equalization system comprises:
an article chamber adapted to receive the hygiene articles for separation;
a picker system; and
an article removal device, the article removal device comprising a transport belt.

3. A hygiene article recycling unit according to claim 1, wherein said shredding and separation device is adapted to disintegrate the hygiene articles and to separate constituents thereof, said shredding and separation device comprising:
an air pressure sealed housing, comprising a shredding device inlet lock for feeding said hygiene articles and a shredding device outlet lock for removing separated parts of said hygiene articles;
at least one rotating drum inside said housing, said at least one rotating drum comprising
drum inlet and drum outlet connected to said shredding device inlet lock and shredding device outlet lock, respectively;
at least one apertured shell element comprising apertures;
a rotating shredder shaft, positioned inside and essentially parallel to the axis of said rotating drum with an axis of the rotating shredder shaft being offset from the axis of said drum;
wherein said rotating shredder shaft further comprises shredding elements along an outer circumference of the rotating shredder shaft and along a length of the rotating shredder shaft,
said housing further comprising:
a transport system, for capturing materials as passing through said apertures of said at least one rotating drum,
wherein
said at least one rotating drum and said rotating shredder shaft are supported at each of their ends;
said rotating shredder shaft has an outer circumference which is larger towards said drum inlet than towards said drum outlet;
wherein said rotating shredder shaft further comprises shredding elements along the outer circumference and along said length.

4. A hygiene article recycling unit according to claim 1, wherein said pulp/SAP separation device comprises
a mix mat former;
a multi stage vibration separator for separating the pulp and the SAP; and
a SAP fluidized bed separators.

5. A process for separating pulp and SAP from plastic material of hygiene articles,
the process comprising:
operating a hygiene article recycling unit according to claim 1.

6. A process according to claim 5, further comprising:
providing said hygiene articles for separation in the article buffer device;

feeding said hygiene articles to the infeed article stream equalization system;

feeding said hygiene articles to said article pre-destruction device;

pre-destructing said hygiene articles in said article pre-destruction device;

feeding said hygiene articles from said pre-destruction device to said shredding and separation device; and separating components of said article into
- a plastic stream comprising thermoplastic material of said hygiene articles; and
- a pulp/SAP stream comprising pulp and SAP material of said hygiene articles;

separating said pulp/SAP stream into a pulp stream and an SAP stream.

7. A process according to claim 6 for separating industrial scrap of article manufacturing or post-use disposed articles.

8. A hygiene article recycling unit according to claim 2, wherein said picker system comprises;
- picker arms that are adapted to allow temporary connecting of said hygiene articles thereto
and that connected to a picker bar; and
- a picker bar mounting adapted to move said picker arms from a pick-up position to a release position.

9. A hygiene article recycling unit according to claim 1, wherein said pulp/SAP separation device further comprises an element selected from the group consisting of:
- an optical pulp purity scanning system, connected to an air nozzle separation system;
- a gravimetric pulp refeed system; and
- a SAP fines removal system.

\* \* \* \* \*